United States Patent [19]

Lumley

[11] 4,306,289
[45] Dec. 15, 1981

[54] DIGITAL COMPUTER HAVING CODE CONVERSION APPARATUS FOR AN ENCRYPTED PROGRAM

[75] Inventor: Robert M. Lumley, Lawrence Township, Mercer County, N.J.

[73] Assignee: Western Electric Company, Inc., New York, N.Y.

[21] Appl. No.: 118,003

[22] Filed: Feb. 4, 1980

[51] Int. Cl.³ .................................................. G06F 5/00
[52] U.S. Cl. .................................................... 364/200
[58] Field of Search ... 364/200 MS File, 900 MS File; 375/2; 178/22

[56] References Cited

U.S. PATENT DOCUMENTS

| | | | |
|---|---|---|---|
| 3,846,763 | 11/1974 | Riikonen | 364/200 |
| 3,889,242 | 6/1975 | Malmer, Jr. | 364/200 |
| 4,042,972 | 8/1977 | Gruner et al. | 364/200 |
| 4,064,554 | 12/1977 | Tubbs | 364/200 |
| 4,120,030 | 10/1978 | Johnstone | 364/200 |
| 4,168,396 | 9/1979 | Best | 364/200 X |

Primary Examiner—Raulfe B. Zache
Attorney, Agent, or Firm—B. W. Sheffield; M. M. de Picciotto

[57] ABSTRACT

The architecture of a conventional digital computer, for example, a microprocessor, is modified by interposing a multiplexer (31), a logic array (32) and a demultiplexer (33) between the instruction register (17) and instruction decoder (18). The logic array "scrambles" the bits in each instruction code; however, if the program to be run is priorly encrypted with this "scrambling" in mind, it will run normally. On the other hand, if the encrypted program is copied, the copied program will not run on an unmodified computer.

7 Claims, 13 Drawing Figures

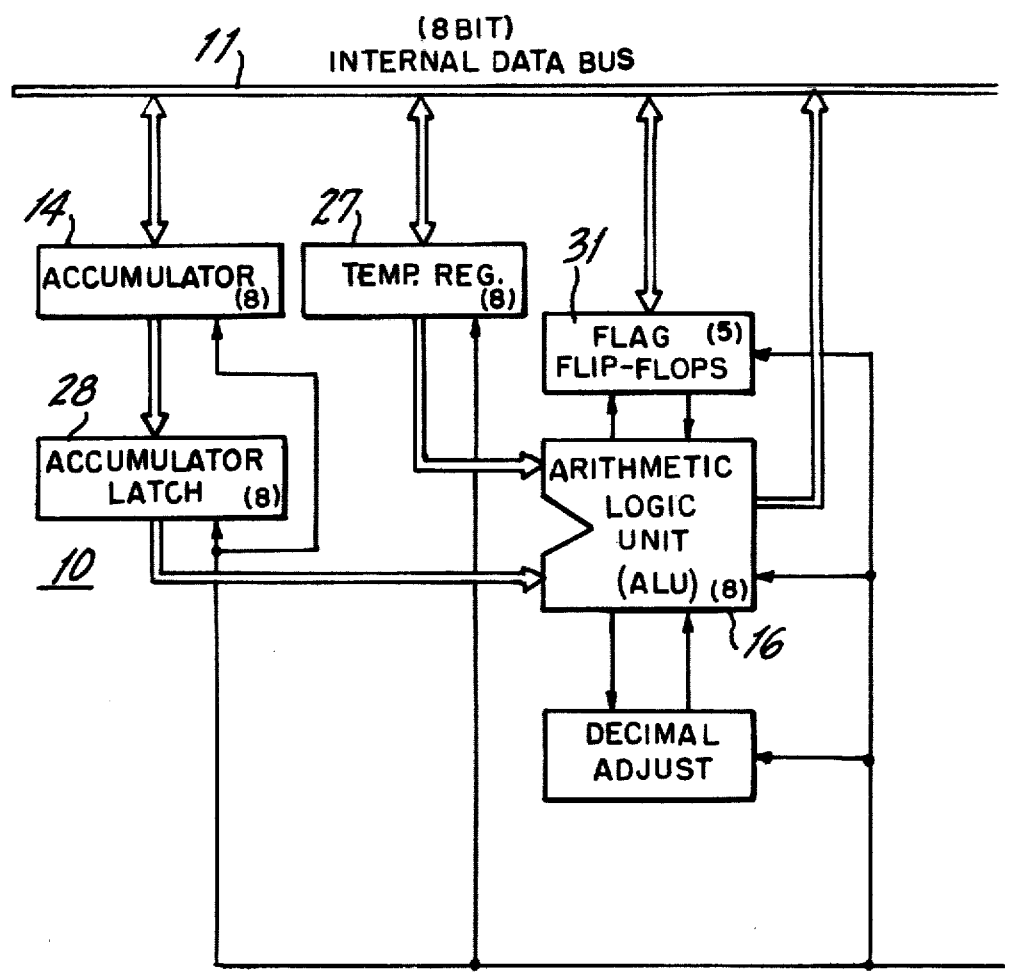
Fig. 1A
(PRIOR ART)
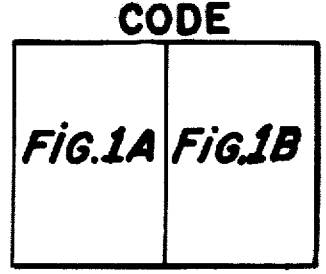

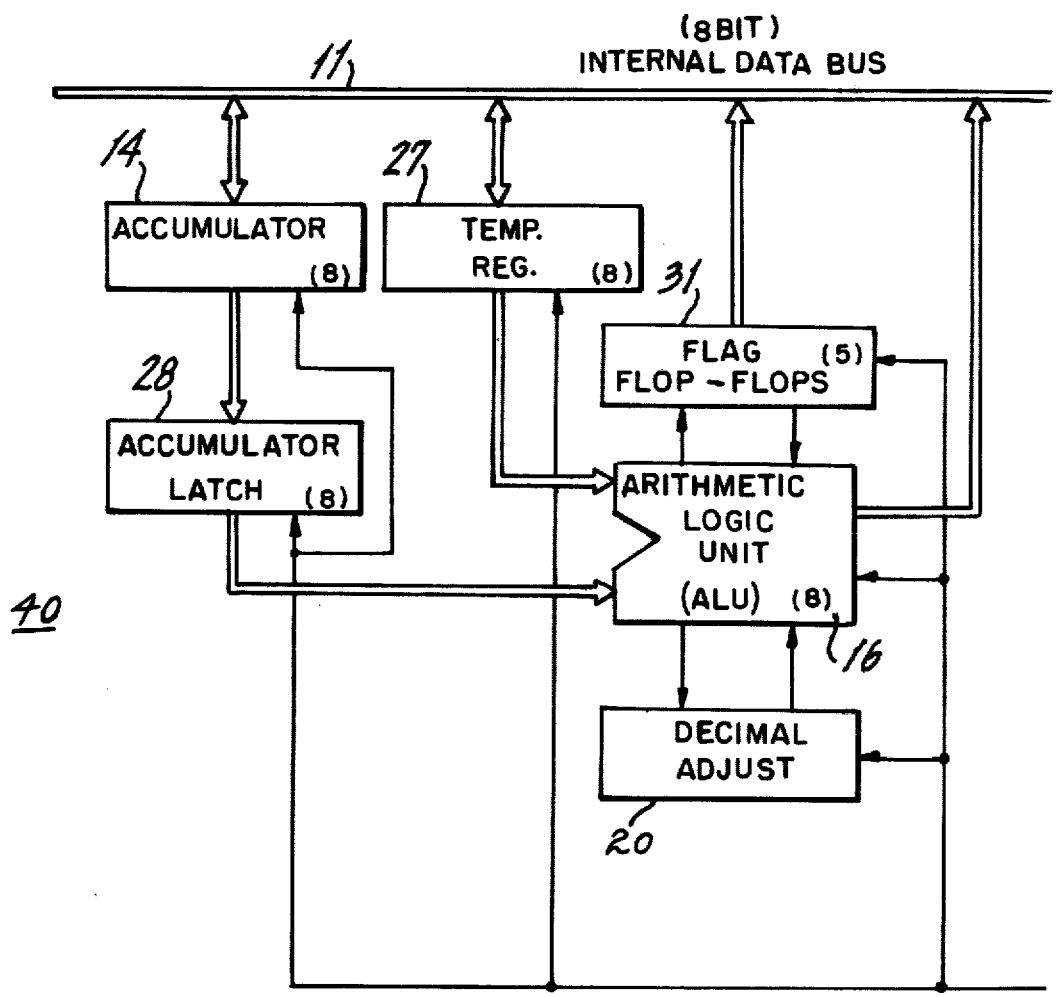
Fig.2A
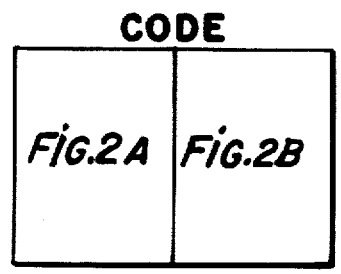

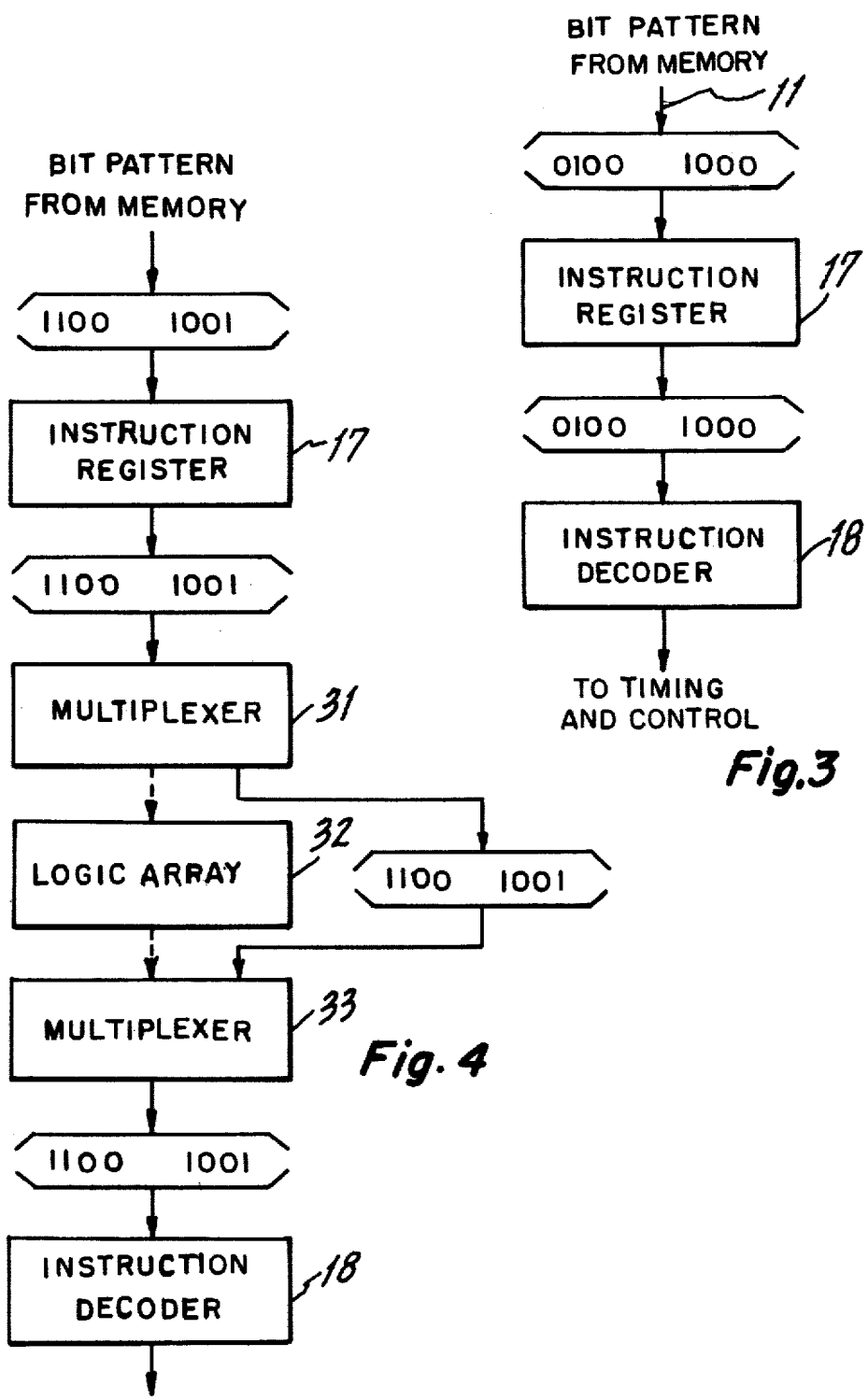

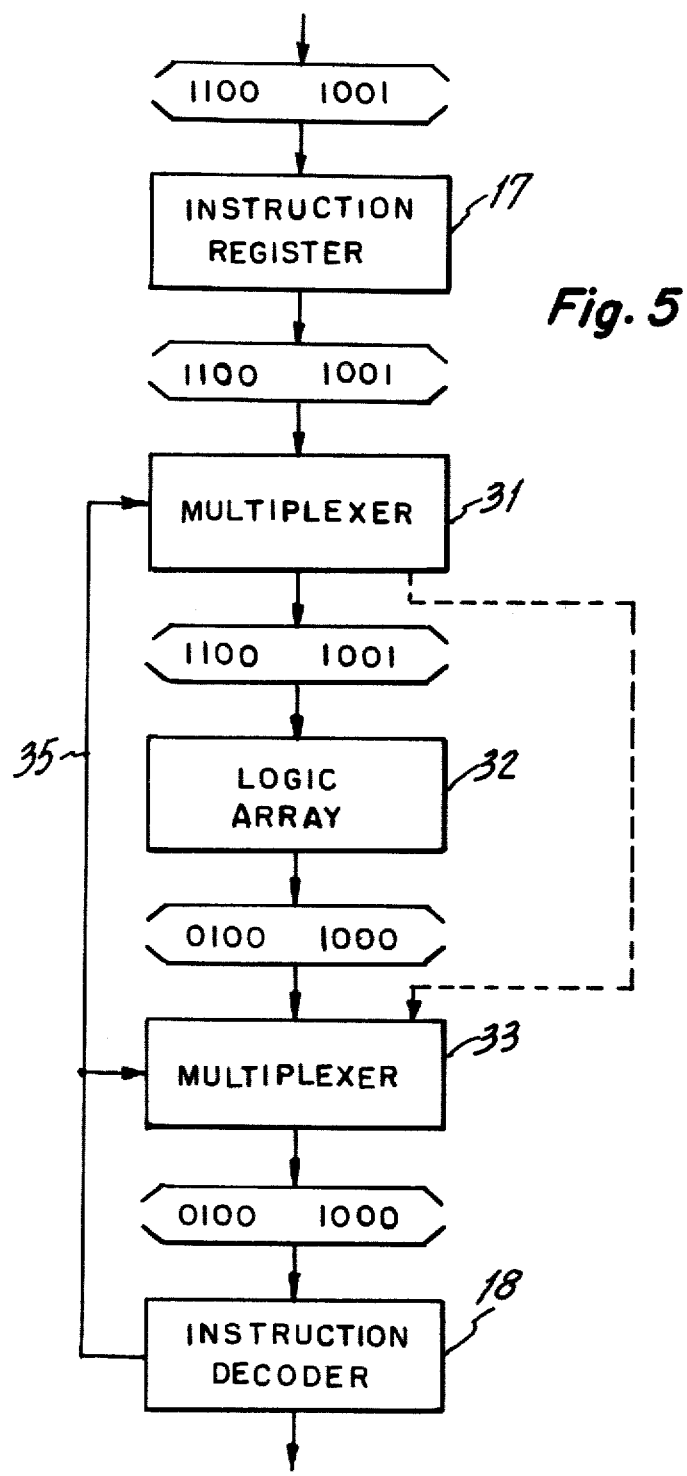

DIGITAL COMPUTER HAVING CODE CONVERSION APPARATUS FOR AN ENCRYPTED PROGRAM

TECHNICAL FIELD

Broadly speaking, this invention relates to digital computers. More particularly, in a preferred embodiment, this invention relates to an electronic digital computer having a modified architecture such that a computer program especially encrypted for use on the modified computer will run normally on that computer, but will not run normally, if indeed it will run at all, on an unmodified computer.

BACKGROUND OF THE INVENTION

Recent advances in the manufacture of very large scale integrated circuits (VLSI) has led to a situation where the cost of a computer and its associated memory has become negligible compared to the cost of developing or aquiring the software required to operate the computer.

Under such circumstances, one would expect to fine a certain degree of software piracy and, indeed, this has been found to be the case, especially where the computer involved uses a microprocessor.

Microprocessor-based computers, sometimes called microcomputers, exclusively comprise the so-called "personal computer"; however, they are also found in business and industry, in competition with the mini and maxi-computer.

While the degree of software piracy that exists among users of "personal computers" is far greater than that found in business and industry, sufficient misappropriation of proprietary software is also found in the latter two instances to cause grave concern.

Software piracy arises, primarily, because of the widespread adoption of magnetic recording media, e.g., floppy disks and cassettes, and, as is well known, with such devices it takes only a few seconds to copy a program from one disk or cassette to another.

Of course, vendors of proprietary software attempt to protect their interests by copyrighting the software and/or by requiring the purchaser to execute some form of contractual agreement which limits his right to duplicate the software or use it on some other CPU. Unfortunately, due to the proliferation of microprocessor-based computer systems, such agreements are difficult to police; indeed, they become impossible to police with respect to "personal computers."

In view of the above, various attempts have been made to solve the software piracy problem. For example, U.S. Pat. No. 4,168,396, which issued on Sept. 18, 1979 to Robert M. Best, discloses a microprocessor which deciphers and executes an encrypted program, one instruction at a time, through a combination of substitutions, transpositions and exclusive-or additions in which the address of each program instruction is combined with the program instruction itself, using a unique set of substitutions. Thus, a program that can be successfully executed in one microprocessor cannot be properly run in any other microprocessor. Unfortunately, the approach taken by Best is expensive, extremely complicated and is not totally immune from attack by a skilled, would-be program pirate.

SUMMARY OF THE INVENTION

As a solution to these and other problems, the instant invention proposes modifying the architecture of a standard computer by interposing a multiplexer, a logic array and a second multiplexer between the instruction register and the instruction decoder such that the programmed instruction codes to be decoded pass through the logic array and are transposed in such a manner that, if the instruction code was priorly encrypted for use on the modified computer, the decoded instruction will be of the correct format to properly instruct the computer to perform the desired data manipulation. On the other hand, the use of the encrypted instruction codes in an unmodified computer will result in erroneous operation, thus, preventing unauthorized use or piracy of the computer program. Advantageously, the multiplexers can be arranged in such a way that, upon receipt of a particular instruction code, all subsequent instruction codes will bypass the logic array and be forwarded directly to the instruction decoder. This ensures that the computer may still be used with conventional, unencrypted programs, which will probably represent a significant proportion of all programs actually run on the computer.

The logical operations which are performed within the logic array may be fixed or, for even greater security, they may proceed in accordance with a code developed by a pseudo-random generator. This latter arrangement greatly complicates any attempt by a would-be pirate to prepare a translation or look-up table to decode the encrypted program, thus ensuring the desirable situation where the cost and effort involved in breaking the code exceeds the cost of purchasing a legitimate copy of the program.

The invention will be more fully understood from the following detailed description, when taken with the appended drawings in which:

BRIEF DESCRIPTION OF THE DRAWINGS

FIG. 1 and FIGS. 1A and 1B are block schematic diagram of a typical prior art microprocessor;

FIG. 2 and FIGS. 2A and 2B are a block schematic diagram of the microprocessor shown in FIG. 1 when modified according to the principles of the instant invention;

FIG. 3 is a block schematic diagram illustrating the flow of program code through the unmodified microprocessor shown in FIG. 1;

FIG. 4 is a block schematic diagram showing the flow of program code through the modified microprocessor shown in FIG. 2 when the microprocessor is arranged to operate with normal, unencrypted programs;

FIG. 5 is a block schematic diagram showing the flow of program code through the microprocessor shown in FIG. 2 when the circuitry is arranged to flow encrypted program codes through the logic array;

DETAILED DESCRIPTION

The invention will now be described with reference to a microprocessor-based computer using, for example, the 8-bit, Intel 8080 microprocessor manufactured by the Intel Corporation, Santa Clara, California. One skilled in the art will appreciate, however, that the instant invention is not limited to use with 8-bit microprocessors but may be used, to equal advantage, in any microprocessor, including the newer 16 and 32-bit designs. Indeed, in its broadest aspect, the instant invention may be used with any type of computer, micro, mini or maxi, although, of course, the problem solved by the instant invention,—software piracy—is most prevalent in the microcomputer industry.

Figure 1B:
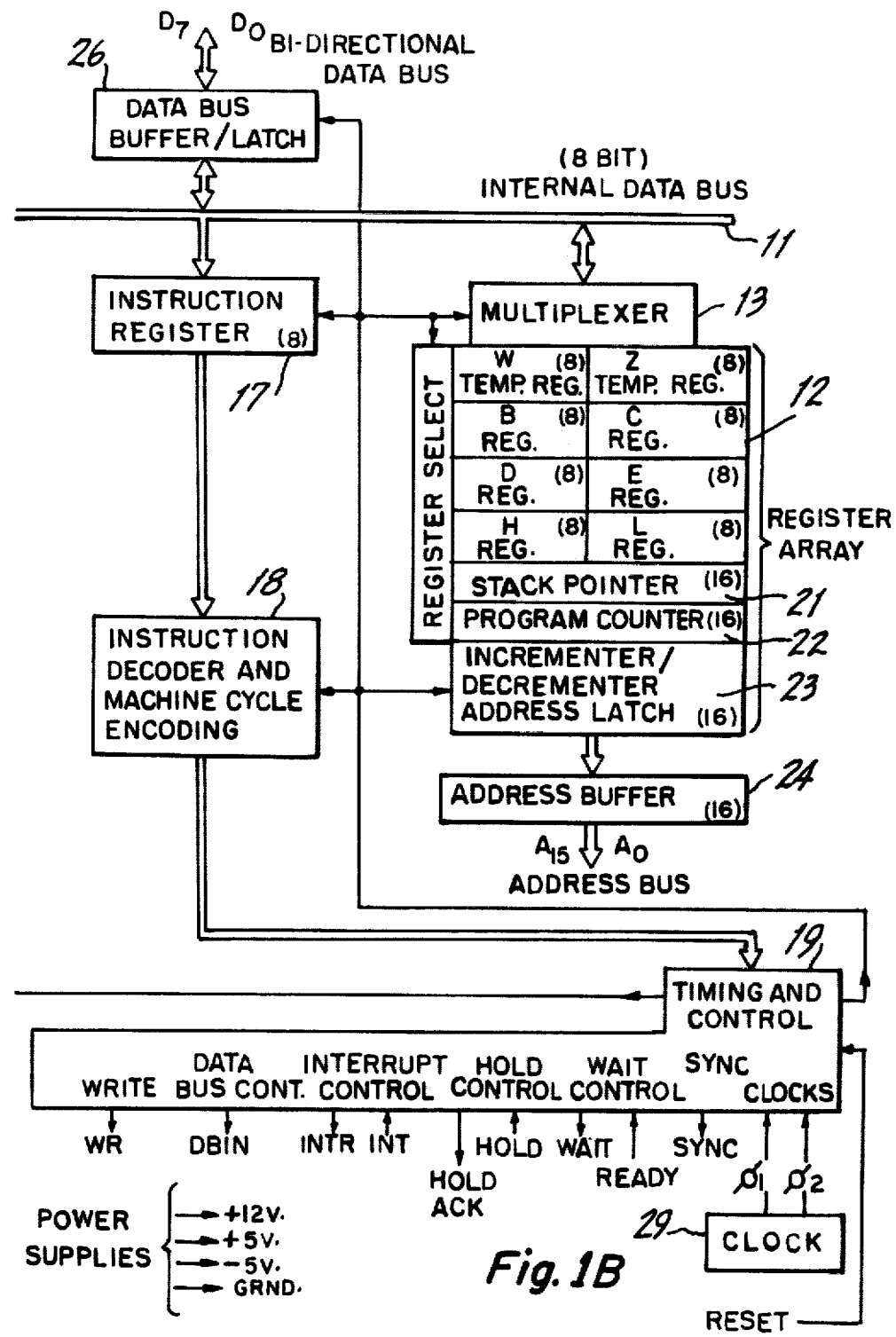

As shown in FIG. 1, microprocessor 10 comprises an LSI integrated circuit including an 8-bit internal data bus 11 to which is connected a register array 12, via a multiplexer 13; an 8-bit accumulator 14; an arithmetic logic unit (ALU) 16; and an 8-bit instruction register 17. Instruction register 17, in turn, is connected to an instruction decoder 18, thence to a timing and control circuit 19.

In the case of the Intel 8080 microprocessor, register array 12 comprises two temporary 8-bit registers W and Z; six 8-bit working registers, registers B-L, respectively; a 16-bit stack pointer 21; and a 16-bit program counter 22. A 16-bit address latch 23 is connected to the microprocessor's address bus ($A_{15}$-$A_0$), via a 16-bit address buffer 24. In like manner, the microprocessor's internal data bus is connected to a bi-directional output data bus ($D_7$-$D_0$), via an 8-bit data buffer 26, and to ALU 16 via an 8-bit temporary register 27. Accumulator 14 is also connected to ALU 16 via an 8-bit latch 28. A crystal-controlled clock 29 operating, for example, at 2 mHz is connected to timing and control circuit 19 to control overall operation and synchronization of the microprocessor. A decimal adjust circuit 40 is connected between ALU 16 and timing and control circuit 19.

The operation of 8-bit microprocessors, such as microprocessor 10, has been widely discussed in the literature. See for example, Intel Corporation, "The Intel 8080 Microcomputer System Users Manual", Intel Corporation, Santa Clara, Claifornia, September, 1975, particularly pages 1-12 to 2-20 and Adam Osborne, "An Introduction to Microprocessors" Adam Osborne and Associates Inc., Berkely, California, 1976, particularly pages 3-12 to 4-65, both of which publications are hereby incorporated by reference, as is more fully set forth herein.

In view of the above, and also in view of the fact that a complete understanding of the operation of a microprocessor is not really necessary to an understanding of the instant invention, a detailed description of the operation of microprocessor 10 will not be given. Suffice it to say that each operation that microprocessor 10 is capable of performing is identified by a unique 8-bit word known as an instruction or operation code. If 8-bits are used to define the instruction code then, obviously, it is possible to define $2^8$ or 256 unique instructions. This is more than enough for the microprocessor disclosed which, at best, requires 200 unique instruction codes. Thus, there are several unused instruction codes which, as we shall see below, may be put to use in the instant invention.

A microprocessor "fetches" an instruction code in two distinct operations. First, the microprocessor transmits the address stored in program counter 22 to memory which, although not shown in FIG. 1, is typically connected to both the data bus ($D_7$-$D_0$), via buffer 26, and the address bus ($A_{15}$-$A_0$), via address buffer 24. Next, the memory returns the 8-bit byte stored at that address to the microprocessor. The microprocessor, in turn, stores this byte as an instruction code in instruction register 17 and uses it to direct activities during the remainder of the instruction execution. Instruction decoder 18 decodes the 8-bits which are stored in instruction register 17 and selectively activates one of a number of internal control lines, in this case up to 256 lines, each of which represents a set of activities associated with the execution of a particular instruction code. The enabled control line can be combined with selected timing pulses to develop electrical signals that can then be used to associate specific actions within the microprocessor, all of which is discussed in far greater detail in the above-cited references.

In a typical, prior-art microprocessor, the instruction register is connected directly to the instruction decoder; hence, incoming instruction codes are always decoded in the same manner. Because of this fact, at the machine-code level, a prior-art microprocessor can accept programs written in one and only one programming format.

Figure 2B:
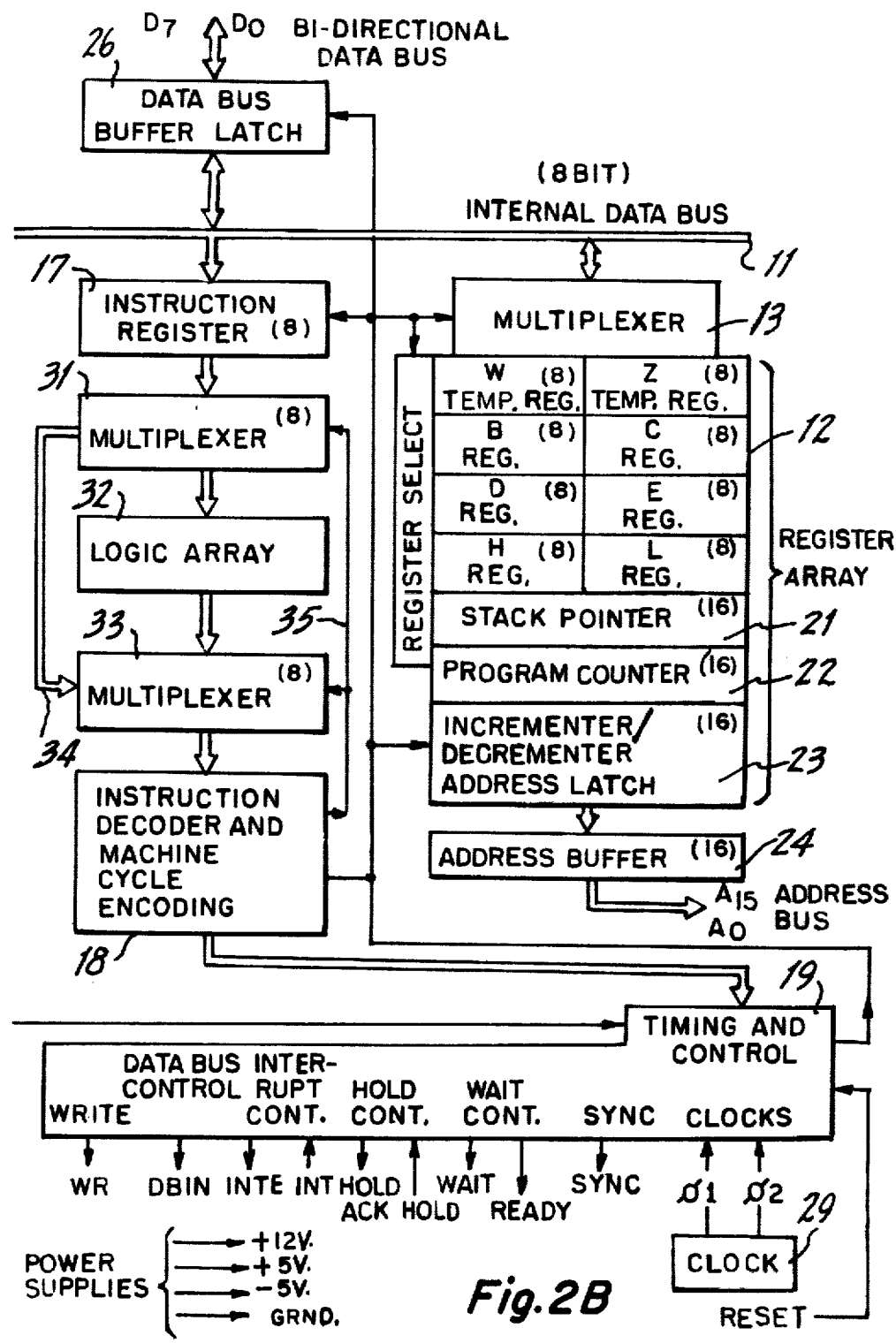

FIG. 2 depicts a microprocessor 50 according to the invention. Microprocessor 50 has units generally analogous to those of microprocessor 10 of FIG. 1 as indicated by identical reference numerals but differs from microprocessor 10 in FIG. 1 in that an 8-bit multiplexer 31, a logic array circuit 32, and an 8-bit multiplexer 33 are interposed, seriatim, between instruction register 17 and instruction decoder 18. Multiplexers 31 and 33 are controlled by a control lead 35 which, in the preferred embodiment, connects to instruction decoder 18. As will be explained, in the modified microprocessor, the 8-bit instruction code stored in register 17 is connected to instruction decoder 18 by means of an 8-bit internal data bus 34 running from multiplexer 31 to multiplexer 33. If the control signal on line 35 is such as to establish an alternate data path through multiplexers 31 and 33, the instruction word stored in register 17 is passed to the instruction decoder via logic array 32.

FIG. 3 depicts the flow of instruction codes through the prior art microprocessor shown in FIG. 1. Consider for example, the instruction that executes a move of the contents of general purpose register B into general purpose register C, i.e., the Intel nemonic MOV C,B, which is represented by the 8-bit word $48_{HEX}$ (or 01001000 in binary). As shown, this instruction code is transferred to instruction register 17 from memory, via the internal data bus 11. At the appropriate clock pulse, the instruction code is forwarded from the instruction register to the instruction decoder where it is decoded to energize the appropriate internal control lead of the microprocessor, thereby to effect the desired operation within the microprocessor, i.e., the transfer of the 8-bit word stored in the B register of array 12 to the C register of array 12.

Let us now consider FIGS. 4 and 5, which show a similar operation performed in the modified microprocessor of FIG. 2. Consider, for example, the operation code which executes a return from a program subroutine, i.e., the Intel nemonic RET, which translate to C9$_{HEX}$ or 11001001 binary. We will consider first the situation shown in FIG. 4 where the signal on control lead 35 arranges the logic within multiplexers 31 and 33 such that the instruction code stored in register 17 bypasses logic array 32 and is forwarded directly to instruction decoder 18. Under these circumstances, instruction decoder 18 will decode the instruction in the normal manner and cause the 16-bit program counter to be loaded with the 16-bit address stored on the system stack which is pointed to by the stack pointer; thus returning control of the program under execution to the instruction immediately following the instruction in the program which called the subroutine.

Consider now the situation shown in FIG. 5 where the signal on control lead 35 is such as to cause the instruction stored in register 17 to be forwarded to logic array 32, rather than being forwarded directly to the instruction decoder. We will again assume that the instruction code forwarded to register 17 is an RET or C9$_{HEX}$ (11001001 binary) instruction, which directs a return from a program sub-routine. However, as shown, the internal arrangement of the gates within logic array 32 is such that for an input of C9$_{HEX}$, (11001001 binary) an output word of 48$_{HEX}$ (01001000 binary) is generated. This word is forwarded to the instruction decoder which decodes it as the code for a move of the contents of general purpose register B to general purpose register C, i.e., the nemonic (MOV C,B), and the instruction will be so implemented. Thus, if a move of the contents of general purpose register B to general purpose register C is, indeed, the code that is desired, then it will be apparent that the program that is actually stored in memory must include a completely different instruction, i.e., the return instruction C9$_{HEX}$ (11001001 binary). More importantly, of course, the self-same instruction, C9$_{HEX}$, (11001001 binary) when applied to an unmodified microprocessor, for example, a standard, off-the-shelf Intel 8080, will result in completely erroneous operation; that is to say, the program will attempt to return from a non-existent subroutine. Of course, a similar result will obtained, not only for the particular instruction code considered in FIG. 5, but for all such instruction codes. That is to say, because each and every instruction in the encrypted program generated for the modified microprocessor is different than the standard operation codes, the program will not run at all on a conventional microprocessor or if it does run will merely generate garbage.

Figure 6:
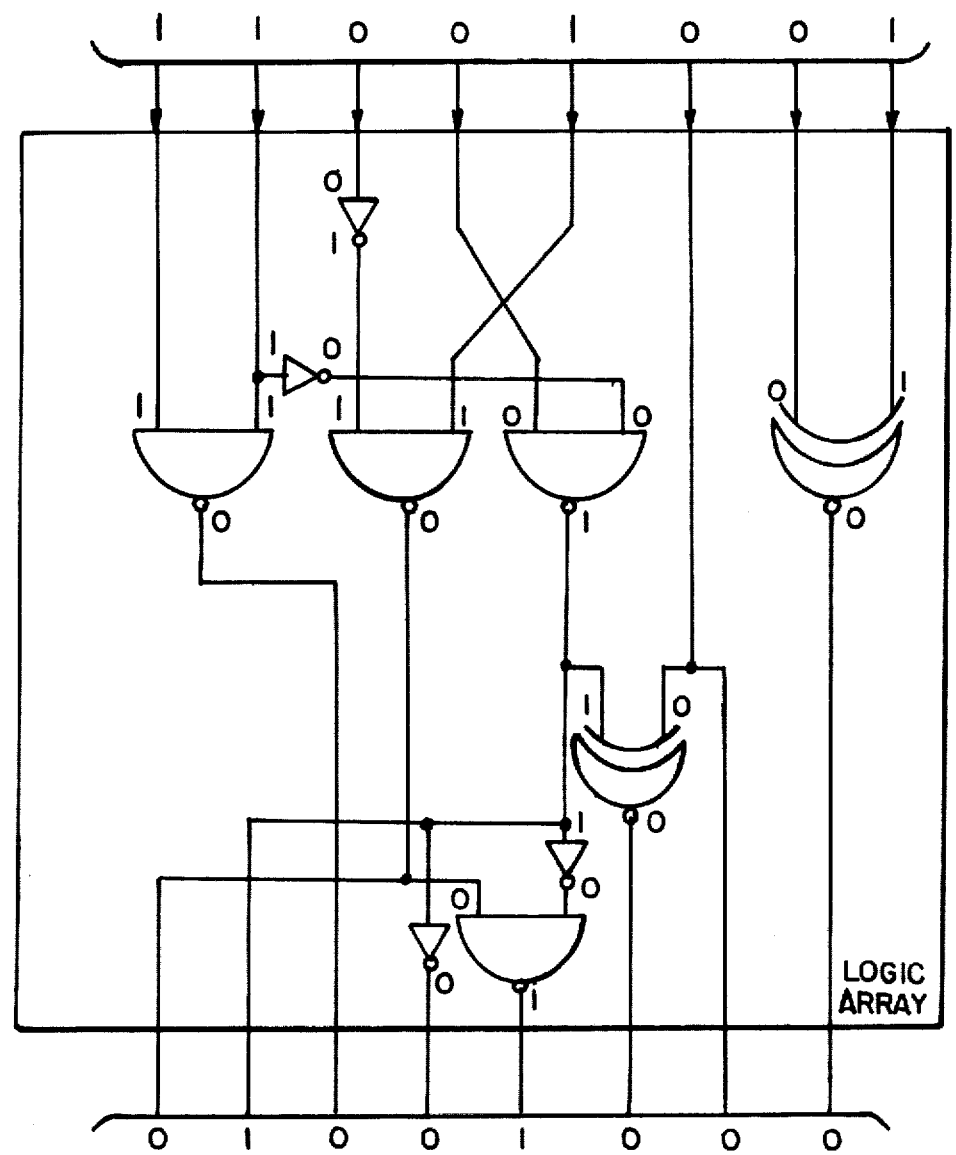
FIG. 6 is a block schematic diagram of a first illustrative embodiment of the logic array shown in FIGS. 4 and 5.
Figure 7:
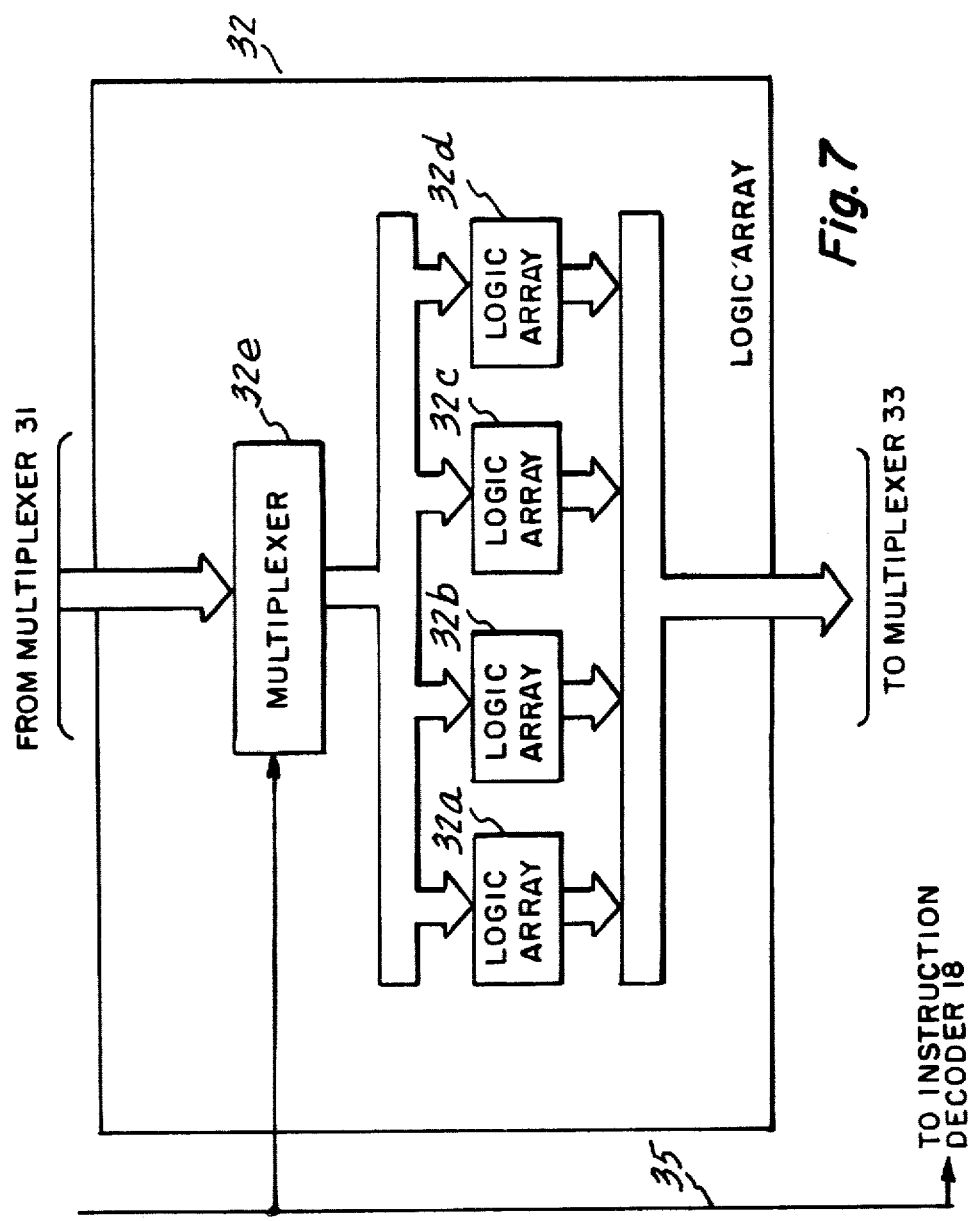
FIG. 7 is a block schematic diagram of another embodiment of the logic array shown in FIGS. 4 and 5.

So far we have not discussed the internal operations within logic array 32. The simplest structure for logic array 32 would be a hardwired arrangement of logic gates, for example, as shown in FIG. 6, in which there is a direct translation between any 8-bit binary word input to the array and the 8-bit binary word which is generated at the output. Although least expensive to implement, this arrangement does not provide 100% security and, as shown in FIG. 7, it may be necessary to provide a plurality of hardwired logic subarrays 32a-32d, each different from the other, switching back and forth via a multiplexer 32e, under program control, during program execution. This arrangement makes it virtually impossible to break the code, and, of course, requires use and decoding of several of the normally unused instruction codes in the standard instruction set.

Figure 8:
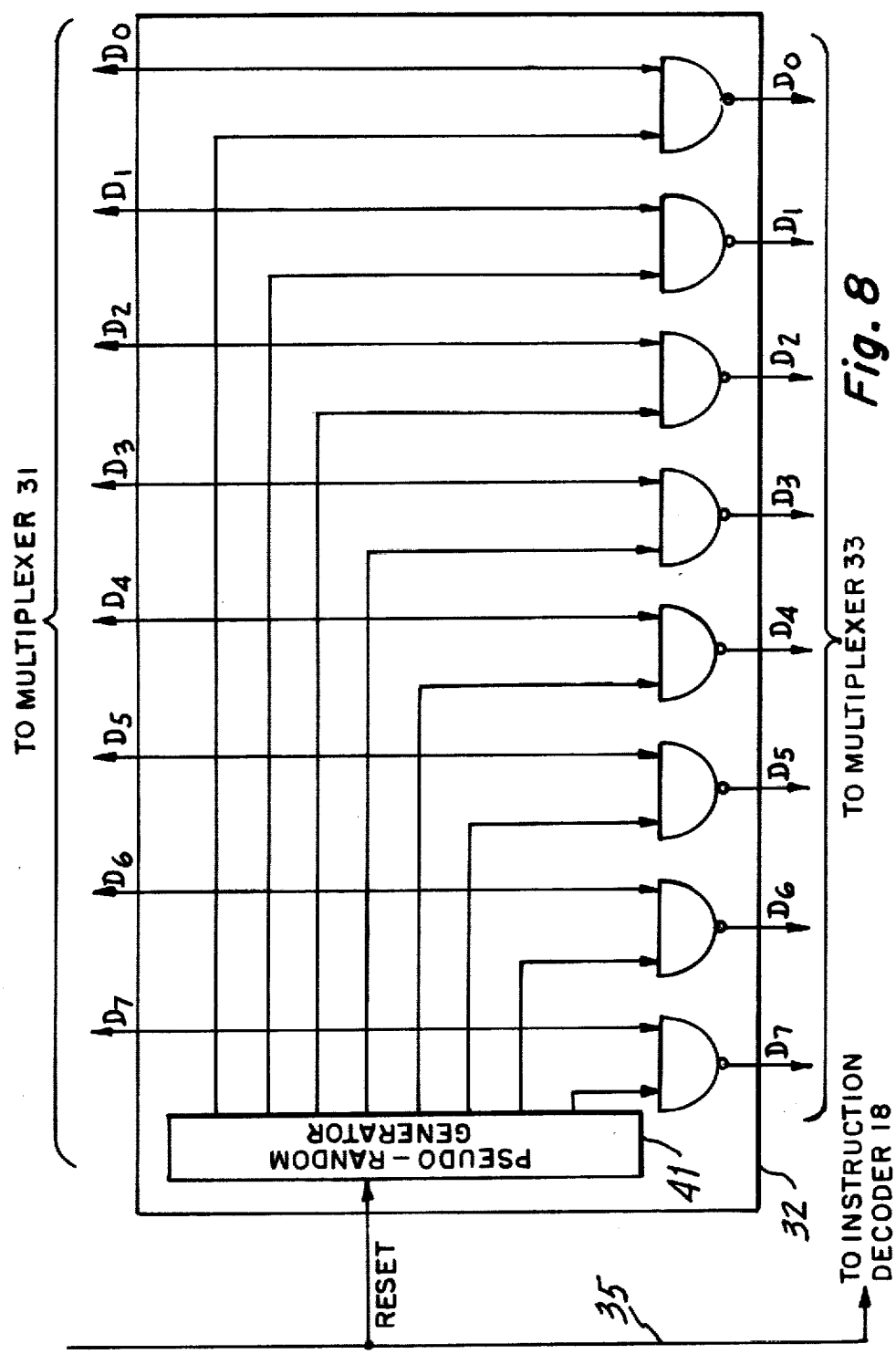
FIG. 8 is a block schematic diagram of yet another embodiment of the logic array using a pseudo-random generator.

Other implementations are possible, for example, as shown in FIG. 8, a pseudo-random generator 41 could be employed to still further complicate the translation between the input instruction code and the desired instruction code. This latter arrangement would be more expensive to implement and would require synchronization between the instruction codes being executed and the desired program flow. However, it would provide the ultimate in program encryption.

We have not yet discussed generation of the signal on control lead 35 which causes the multiplexers 31 and 33 to switch from normal operation to encrypted operation. This could, of course, be done by hardware, i.e., a switch or button on the front panel of the microprocessor. However, it is also possible to cause this signal to be generated upon receipt of the appropriate operation code or codes which would, of course, advantageously comprises the first operation code in a given encrypted program.

As previously discussed, a further enhancement of the invention would be to cause the logic array to switch back and forth between any of several bit translation patterns, again, under program control. In that event, as shown in FIG. 7, the logic array itself is connected to control lead 35. Thus, the instruction decoder would be arranged to decode additional instruction codes, which themselves would be encrypted, still further compounding the difficulty of cracking the code. Of course, whatever format is chosen, logic array 32, and multiplexers 31 and 33 are advantageously fabricated on the same LSI chip as is the basic miroprocessor—a relatively easy task with todays manufacturing techniques and computer-aided mask design. Such custom chips would, of course, be manufactured at the request of the software proprietor who could control their distribution. One can envision a purchaser of a particular piece of proprietary software receiving the software, in encrypted form, along with the microprocessor chip on which to run it. Thus, while an amoral purchaser could readily copy the software and give it, ex gratia, to a friend or colleague, since the friend or colleague could only obtain the custom chip needed to turn the software from the software vendor, the copied software is useless. Obviously, he will not part with additional chips readily, in effect giving the software vendor absolute control over the use of his software.

Figure 9:
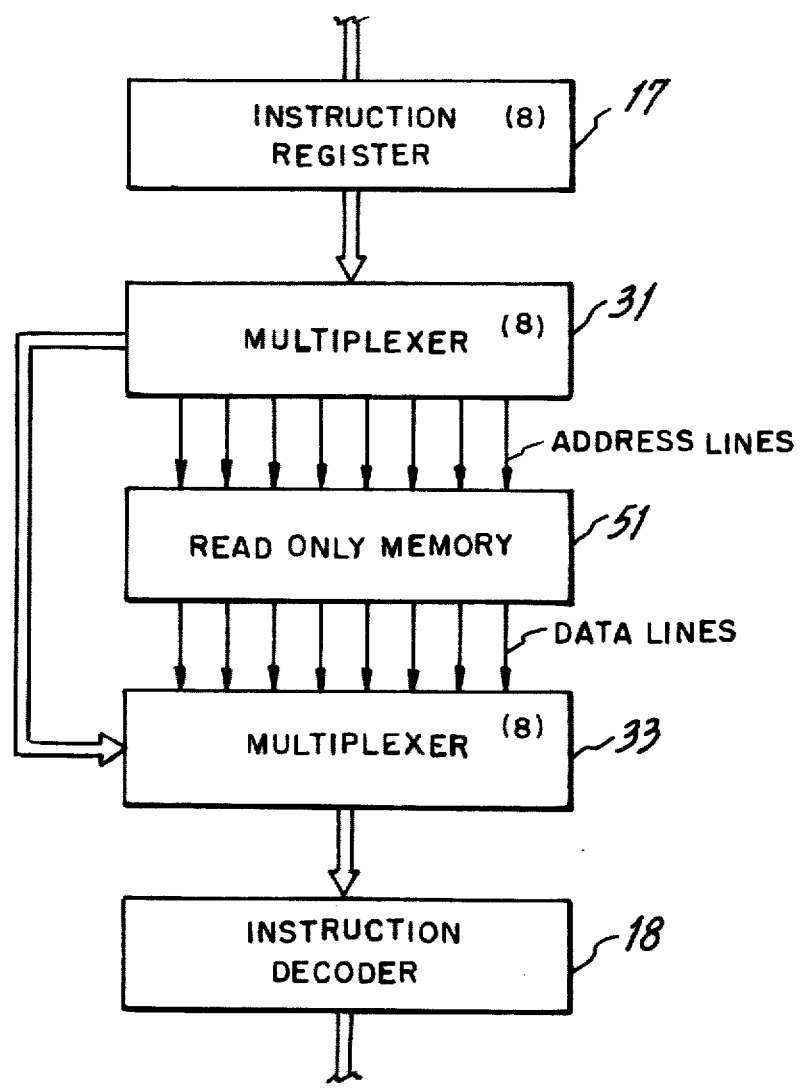
FIG. 9 is a block schematic diagram of yet another embodiment of the logic array utilizing a read-only memory.

Yet another implementation of the logic array is to fabricate one or more read-only-memory (ROM) locations on the microprocessor chip. As shown in FIG. 9, for an 8-bit microprocessor the 8 address lines of a ROM 51 are connected to the instruction register via multiplexer 31 and the 8 data lines from ROM 51 thus comprise the input to the instruction decoder, via multiplexer 33. The decoding, in effect, is done via a look-up table permanently stored in the chip and inaccessible to the would-be pirate. A further enhancement is to use erasable, programmable read-only-memory (EPROM) and, in that event, the software vendor can "recall" the microprocessor for periodic re-programming of the look-up table, furnishing the registered owner of the chip with a re-encrypted copy of the software.

One skilled in the art may make various changes and substitutions to the layout of parts shown without departing from the spirit and scope of the invention.

What is claimed is:

1. An improved electronic digital computer comprising:
   an internal data bus;

a register array coupled to said internal bus and including a plurality of general purpose data registers;

an accumulator connected to said internal data bus;

an arithmetic logic unit connected to said accumulator and to said internal data bus for performing logical operations on the data stored in said accumulator and in said general purpose registers;

an instruction register connected to said internal data and adapted to receive program instruction codes; and an instruction decoder connected to said instruction register and responsive to selected ones of said program instruction codes, WHEREIN THE IMPROVEMENT COMPRISES means, within the electronic digital computer, interposed between said instruction register and said instruction decoder, for selectively transforming the bit pattern of a program instruction code into a second instruction code thereby enabling said computer to selectively respond to sequences of program instruction codes which have priorly been encrypted as instruction codes in non-standard format.

2. The computer according to claim 1, wherein said transforming means comprises:

a first multiplexer connected to the output of said instruction register;

a logic array circuit connected to the output of said first multiplexer for producing a predetermined translation between the bits comprising the instruction code input thereto and the instruction code output therefrom;

a second multiplexer connected to the output of said logic array circuit; and means for activating said first and second multiplexers such that the flow of program instruction code from said instruction register to said instruction decoder selectively bypasses said logic circuit.

3. The computer according to claim 2, wherein said logic array circuit comprises a plurality of logic gates interconnected in accordance with a predetermined pattern and interposed between the input of said logic array circuit and the output thereof for producing a predetermined fixed translation of the bits comprising said program instruction code.

4. The computer according to claim 2, wherein said logic array circuit comprises:

a plurality of logic subarray circuits, each comprising a plurality of logic gates interconnected in accordance with a predetermined pattern, said logic subarray circuits being interposed between the input of said logic array circuit and the output thereof; and means coupled to the logic subarray circuits for selectively routing the flow of program instruction codes through a particular one of said logic subarray circuits.

5. The computer according to claim 4, further comprising:

means, responsive to a control signal from said instruction decoder, for selectively routing the flow of program instruction codes through different ones of said plurality of logic subarray circuits during execution of a sequence of program instruction codes.

6. The apparatus according to claim 2, wherein said logic array circuit comprises:

a plurality of logical elements each having at least two inputs, one of which connects to the corresponding bit input of said program instruction code; and a pseudo-random generator having a plurality of outputs each of which connects to a corresponding other input of said logic elements, whereby the bit translation effected between an incoming program instruction code and the output program instruction code changes, in a pseudo-random fashion, at predetermined intervals during the execution of said program.

7. The apparatus according to claim 2, wherein said logic array circuit comprises:

a read-only memory having a plurality of address lines and a corresponding plurality of data output lines, said address lines being connected to said instruction register via said first multiplexer and said data output lines being connected to said instruction decoder via said second multiplexer whereby the selective bit transposition is effected by means of a look-up table priorly stored in said read-only memory.

* * * * *